US 12,279,552 B2

(12) United States Patent
Lardieri et al.

(10) Patent No.: US 12,279,552 B2
(45) Date of Patent: Apr. 22, 2025

(54) BLADE CONTROL ASSEMBLY, LAWNMOWER, AND METHOD FOR OPERATING A BLADE CONTROL ASSEMBLY

(71) Applicant: Honda Motor Co., Ltd., Tokyo (JP)

(72) Inventors: Lawrence J. Lardieri, Greensboro, NC (US); Scott J. Kaskawitz, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 772 days.

(21) Appl. No.: 17/545,354

(22) Filed: Dec. 8, 2021

(65) Prior Publication Data

US 2023/0172101 A1 Jun. 8, 2023

(51) Int. Cl.
| | |
|---|---|
| A01D 34/82 | (2006.01) |
| A01D 34/00 | (2006.01) |
| A01D 34/68 | (2006.01) |
| A01D 34/78 | (2006.01) |
| A01D 69/02 | (2006.01) |
| A01D 101/00 | (2006.01) |

(52) U.S. Cl.
CPC ....... *A01D 34/6812* (2013.01); *A01D 34/006* (2013.01); *A01D 34/78* (2013.01); *A01D 2034/6843* (2013.01); *A01D 2101/00* (2013.01)

(58) Field of Classification Search
CPC .. A01D 34/6812; A01D 34/006; A01D 34/78; A01D 34/0631; A01D 34/6806; A01D 34/824; A01D 2101/00; A01D 2034/6843
See application file for complete search history.

(56) References Cited

U.S. PATENT DOCUMENTS

| | | | |
|---|---|---|---|
| 5,146,735 A | 9/1992 | McDonner | |
| 5,806,374 A | 9/1998 | Mizutani et al. | |
| 6,082,083 A | 7/2000 | Stalpes et al. | |
| 6,230,678 B1 | 5/2001 | Gracyalny et al. | |
| 6,325,036 B1 | 12/2001 | Gracyalny et al. | |

(Continued)

FOREIGN PATENT DOCUMENTS

| | | |
|---|---|---|
| EP | 0047416 B1 | 10/1984 |
| EP | 1431998 A2 | 6/2004 |
| EP | 3120684 B1 | 9/2018 |

*Primary Examiner* — Adam J Behrens
*Assistant Examiner* — Robert E Pezzuto
(74) *Attorney, Agent, or Firm* — KENEALY VAIDYA LLP

(57) ABSTRACT

A blade control assembly for a lawnmower can include a controller configured to selectively transition between a sleep mode and an operational mode. The controller can be configured to transition from the sleep mode to the operational mode when the controller receives a first ON signal. The controller can be configured to cause a power source to transition from an idle state in which a blade of the lawnmower is stopped to a driving state in which the power source rotationally drives the blade when the controller receives the first ON signal and a second ON signal. The controller can be configured to cause the power source to stop rotation of the blade and cause to power source to transition to the idle state after the second ON signal terminates, and can be configured to transition from the operational mode to the sleep mode after the second ON signal terminates.

19 Claims, 7 Drawing Sheets

(56) References Cited

U.S. PATENT DOCUMENTS

| | | | |
|---|---|---|---|
| 6,595,176 B2 | 7/2003 | Poehlman et al. | |
| 6,647,942 B2 | 11/2003 | Poehlman et al. | |
| 6,751,936 B2 | 6/2004 | Kucera et al. | |
| 7,762,049 B2 | 7/2010 | Eaton et al. | |
| 9,596,806 B2 | 3/2017 | Yamaoka et al. | |
| 9,717,177 B2 | 8/2017 | Bian et al. | |
| 10,085,380 B2 * | 10/2018 | Kuriyagawa | A01D 43/0631 |
| 2012/0317949 A1 | 12/2012 | Abe et al. | |
| 2019/0307066 A1 | 10/2019 | Jiang | |
| 2023/0048445 A1 * | 2/2023 | Ertl | A01D 34/6806 |
| 2023/0049667 A1 * | 2/2023 | Ertl | A01D 34/824 |

* cited by examiner

BLADE CONTROL ASSEMBLY, LAWNMOWER, AND METHOD FOR OPERATING A BLADE CONTROL ASSEMBLY

BACKGROUND

The disclosed subject matter relates to a lawnmower. More particularly, the disclosed subject matter relates to methods and apparatus that selectively activate and deactivate a power source that drives a blade of the lawnmower.

Lawnmowers can be powered by an internal combustion engine or by an electric motor or possibly even a hybrid of these two types of motor. The internal combustion engine or electric motor can be connected to one or more blades to rotate the blade(s) inside of a cutting chamber. Electric lawnmowers can rely on an external power source such as a wall outlet and can be connected to the wall outlet by an electrical cable (also referred to as an extension cord). Alternatively, electric lawnmowers can include an internal power supply such as a battery pack that includes one or more battery cells.

Lawnmowers can include a blade brake system that is either mechanically, electrically of electro-mechanically connected to the power source and/or the drive shaft of the blade such that the power source drives the blade when a blade brake lever is in a first position and stops rotation of the blade and deactivates the power source when the blade brake lever is in a second position.

SUMMARY

Some embodiments are directed to a blade control assembly for a lawnmower. The lawnmower can include a power source and a blade rotatably driven by the power source. The blade control assembly can include a controller. The controller can be configured to selectively transition between a sleep mode and an operational mode. The controller can be configured to transition from the sleep mode to the operational mode when the controller receives a first ON signal. The controller can be configured to cause the power source to transition from an idle state in which the blade is stopped to a driving state in which the power source rotationally drives the blade when the controller receives the first ON signal and a second ON signal. The controller can be configured to cause the power source to stop rotation of the blade and cause the power source to transition to the idle state after the second ON signal terminates. The controller can be configured to transition from the operational mode to the sleep mode after the second ON signal terminates.

Some embodiments are directed to a lawnmower that can include a deck, a power source mounted on the deck, a blade, an input control assembly and a controller. The deck can include a cutting chamber. The blade can be rotatably supported in the cutting chamber and rotationally driven by the power source. The input control assembly can be configured to selectively transmit a first ON signal, a first OFF signal, a second ON signal, and a second OFF signal. The controller can be in electrical communication with the input control assembly and configured to selectively transition between a sleep mode and an operational mode. The controller can be configured to transition from the sleep mode to the operational mode when the controller receives the first ON signal. The controller can be configured to cause the power source to transition from an idle state in which the blade is stopped to a driving state in which the power source rotationally drives the blade when the controller receives the first ON signal and the second ON signal. The controller can be configured to continue causing the power source to drive the blade when the controller receives the second ON signal and the first OFF signal. The controller can be configured to cause the power source to stop rotation of the blade and can be configured to transition to the sleep mode when the controller receives the second OFF signal.

Some embodiments are directed to method for operating a blade control system for a lawnmower having a controller, a power source, and a blade. The method can include: holding down a button to engage a first switch; causing the controller to transition from a sleep mode to an operational mode and wait in a ready state of the operational mode in response to the button engaging the first switch; rotating a lever to engage a second switch while the button engages the first switch; driving the power source with the controller to initiate rotation of the blade while the button engages the first switch and the lever engages the second switch; releasing the button while the lever engages the second switch and the controller is driving the power source; using the controller to cause the power source to stop rotation of the blade after releasing the lever; and transitioning the controller from the operational mode to the sleep mode after stopping rotation of the blade and operation of the power source.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
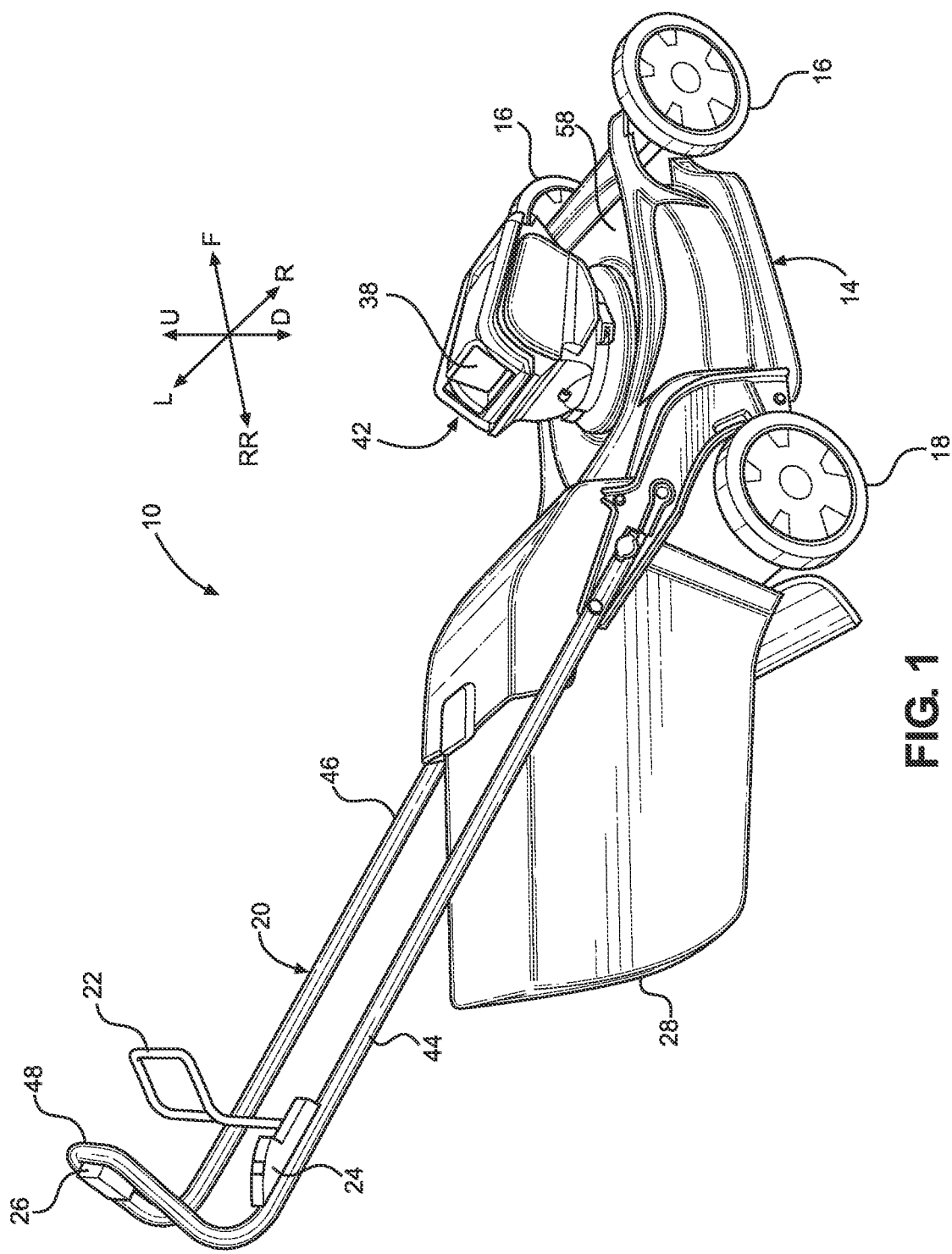
FIG. 1 is a perspective view of a lawnmower made in accordance with principles of the disclosed subject matter.
Figure 2:
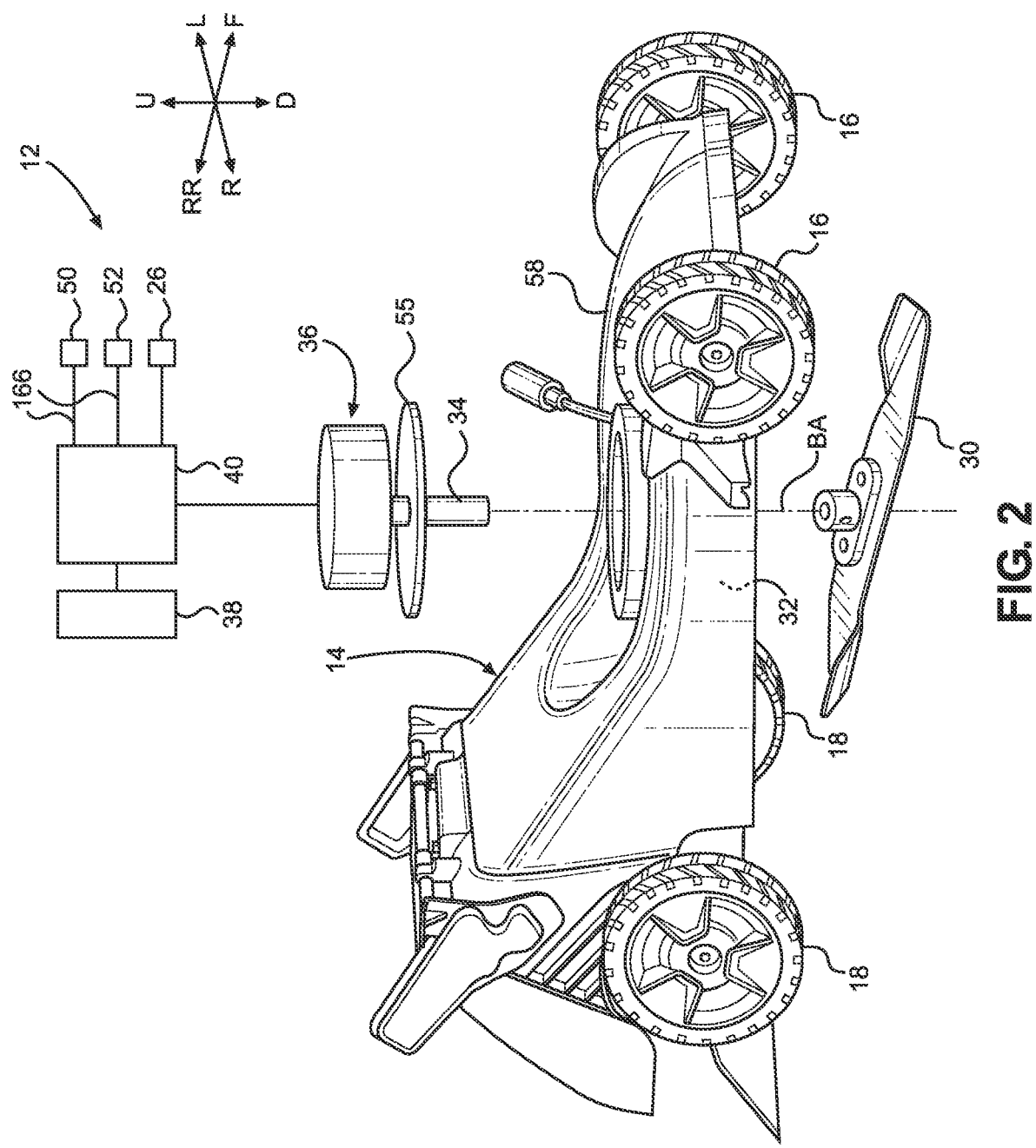
FIG. 2 is an exploded perspective view of a lower portion the lawnmower of FIG. 1 and schematically illustrates a portion of a blade control assembly of the lawnmower of FIG. 1.

FIG. 1 is a perspective view of a lawnmower 10 made in accordance with principles of the disclosed subject matter. Referring to FIGS. 1 and 2 collectively, the lawnmower 10 can include a blade control assembly 12, a blade 30, and a power source 36. The blade control assembly 12 can be configured to control the power source 36 and rotation of the blade 30.

Referring to FIG. 2, the power source 36 can be configured as an electric motor and the lawnmower 10 can include a power supply 38. The blade control assembly 12 can include a power distribution unit ("PDU") 40 and a pair of switches 50, 52. FIG. 2 schematically illustrates the power supply 38, the PDU 40 and the switches 50, 52. The PDU 40 can control the supply of electricity to the power source 36 from the power supply 38. The power supply 38 can include one or more batteries. The PDU 40 can draw electricity from the power supply 38 during operation of the PDU 40. The switches 50, 52 can provide interfaces for a user of the lawnmower 10 to input commands to the PDU 40. Further details of the switches 50, 52 will be described below.

The PDU 40 can be configured to execute a plurality of different tasks such as but not limited to controlling the supply of electricity from the power supply 38, monitoring the state of charge of the power supply 38, monitoring the state of health of the power supply 38, monitoring the operating temperature of the power source 36, monitoring the operating temperature of the power supply 38, displaying one or more messages to a user of the lawnmower 10 regarding the operational status of the lawnmower 10, etc.

In order to reduce the overall power drawn by the PDU 40 from the power supply 38, the PDU 40 can include a sleep mode and an operational mode. The PDU 40 can be configured to draw less power in the sleep mode than in the operational mode. The sleep mode can correspond to a state in which the lawnmower 10 is not in use and the operational mode can correspond to a state in which the lawnmower 10 is in use for its intended purpose(s), such as cutting grass and vegetation. In the operational mode, the PDU 40 can be configured to prioritize operational performance of the PDU 40 over the discharge rate of the power supply 38 by the PDU 40. In the sleep mode, the PDU 40 can be configured to prioritize the discharge rate of the power supply 38 by the PUD 40 over performance of the PDU 40.

In an exemplary embodiment, the PDU 40 can be configured to simultaneously execute a plurality of tasks in the operational mode and execute only one task at a time in sleep mode. In another exemplary embodiment, the PDU 40 can be configured to bypass one or more tasks that are not beneficial when the lawnmower 10 is not in use. In another exemplary embodiment, the PDU 40 can be configured to execute one or more tasks at a first predetermined time interval in the operational mode, and in the sleep mode execute one or more tasks at a second predetermined time interval that is less than the first predetermined time interval. Exemplary embodiments can include other appropriate variations between the sleep mode and the operation mode such that power consumption by the PDU 40 is less in the sleep mode than in the operational mode. Further details of the blade control system 12 will be described below.

Referring to FIGS. 1 and 2, the electric lawnmower 10 can extend in a forward direction F, a rearward direction RR, a leftward direction L, a rightward direction R, a downward direction D and an upward direction U. Referring to FIG. 2, the upward direction U and the downward direction D can be parallel to a blade rotational axis BA and can be opposite directions with respect to each other. The directions F, RR, and L, R, and U, D can be orthogonal to each other, respectively.

Figure 3:
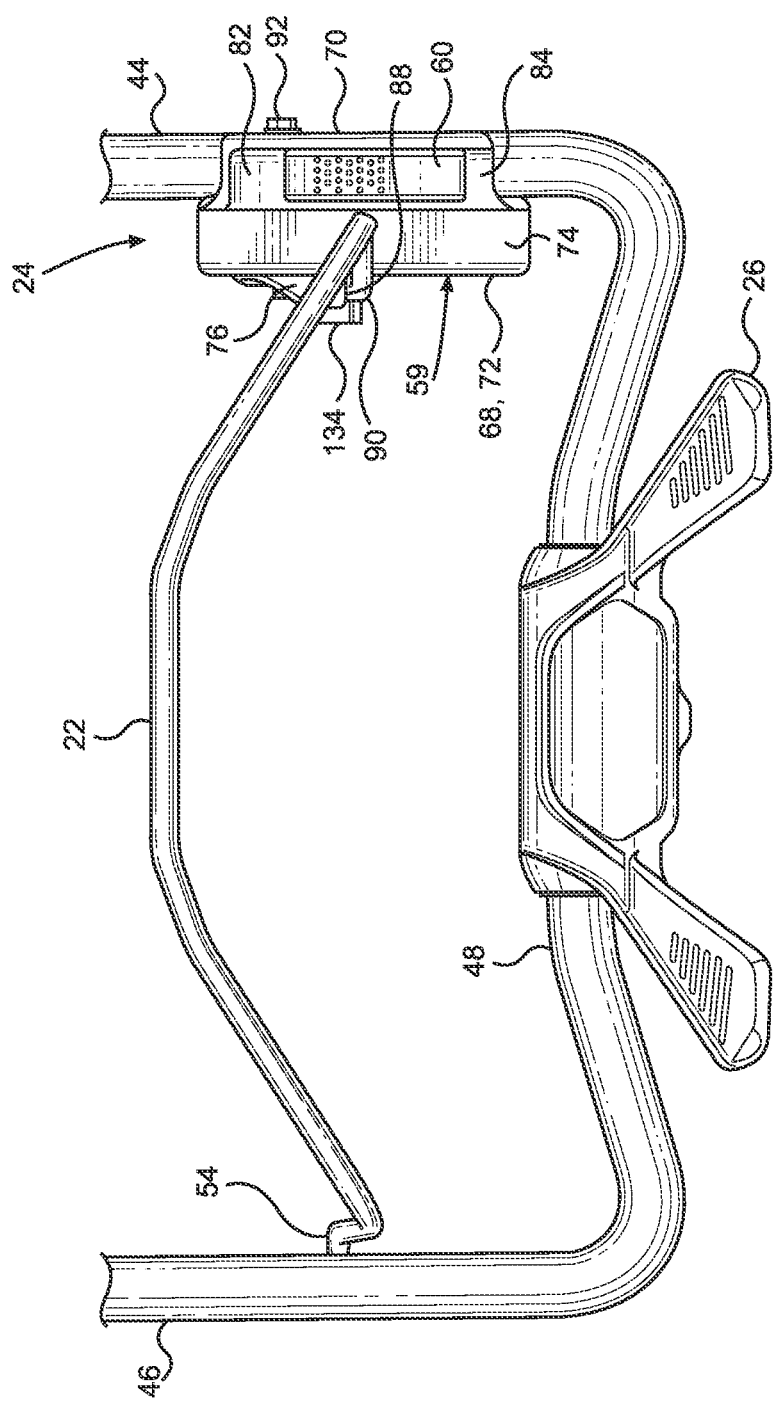
FIG. 3 is a plan view of a handle and a portion of the blade control assembly of the lawnmower of FIG. 1.

Referring to FIGS. 1 and 2, the lawnmower 10 can include a deck 14, a pair of front wheels 16, a pair of rear wheels 18 (the left rear wheel is obstructed from view in FIG. 1 by the deck 14) and a handle 20. The handle 20 is omitted from FIG. 2 for clarity and simplicity of the drawing. Referring to FIGS. 1 and 3, the blade control assembly 12 can include a blade brake lever 22 and a first input control assembly 24. The lawnmower 10 can include a second input control assembly 26 that is schematically illustrated in FIG. 2. Referring to FIG. 1, the lawnmower 10 can include a collection bag 28. The deck 14 can also be referred to as a mower deck or as a cutter deck or as a cutter housing.

Referring to FIG. 2, the blade 30 can be mounted in a cutting chamber 32 of the deck 14. A driveshaft 34 can be connected to each of the power source 36 and the blade 30. The power source 36 can be configured to rotate the drive shaft 34 and the blade 30 inside the cutting chamber 32.

Referring to FIG. 1, the power source 36, the power supply 38 and the PDU 40 can be contained in a motor housing 42. The motor housing 42 can be configured to facilitate the flow of cooling air past the power source 36, the power supply 38 and the PDU 40.

The power supply 38 can be configured as a battery pack that includes one or more batteries contained in a module that can be selectively removed from and installed in the motor housing 42 to facilitate charging of the battery(ies) by a charging unit that can be remote from the lawnmower 10. Alternate embodiments can include a power supply 38 configured as one or more batteries that are semi-permanently mounted inside the motor housing 42 such that the battery(ies) are not routinely removed from the motor housing 42 for charging. In this alternate embodiment, the lawnmower 10 can include a charging port that is configured to connect to supply of electrical current such as but not limited to a standard wall socket or a dedicated charging station.

A user of the lawnmower 10 can grasp the handle 20 in order to guide the path of travel of the lawnmower 10. The handle 20 can include a right extension 44, a left extension 46 and a U-shaped portion 48 that connects to and extends from each of the extensions 44, 46. The handle 20 can support the blade brake lever 22, the first input control assembly 24 and the second input control assembly 26.

The blade brake lever 22 can be pivotally mounted on the handle 20. The blade brake lever 22 can also be configured to selectively permit the power source 36 to drive the blade 30 and stop rotation of the blade 30. When in the position shown in FIG. 1, the blade brake lever 22 can cause the power source 30 to prevent or stop rotation of the blade 30. When pivoted toward the U-shaped portion 48, the blade brake lever 22 can cause the power source 36 to rotate the blade 30.

The first input control assembly 24 can be mounted on the handle 20 in any appropriate position and orientation on the handle 20 that can facilitate interaction with a user of the lawnmower 10. In the exemplary embodiment of FIG. 1, the first input control assembly 24 can be mounted on the upper portion of the right extension 44 of the handle 20. The first input control assembly 24 can be configured to actuate one or more operational features of the lawnmower 10. In one exemplary embodiment, the first input control assembly 24 can be configured to cooperate with the blade brake lever 22 in order to signal the PDU 40 to transition from the sleep mode to the operational mode and to signal the PDU 40 to drive or stop rotation of the blade 30 via the power source 36. The first input control assembly 24 can include the switches 50, 52.

The second input control assembly 26 can be mounted on the handle 20 in any appropriate position and orientation on the handle 20 that can facilitate interaction with a user of the lawnmower 10. In the exemplary embodiment of FIGS. 1 and 3, the second input control assembly 26 can be mounted on the U-shaped portion 48 of the handle 20. In an exemplary embodiment, the second input control assembly 26 can include a switch, lever or knob configured to selectively electrically (or mechanically) connect a self-propulsion assembly to the power source 36. The self-propulsion assembly can include an electric drive motor that can apply torque to at least one of the lawnmower wheels, such as one or both of the rear wheels 18. The second input control system 26 can be configured to adjust the speed at which the self-propulsion assembly propels the lawnmower 10 along the ground. The self-propulsion system can be driven by the power source 36 or by a separate power source, such as but not limited to an electric motor or a hydrostatic drive assembly.

The collection bag 28 can be in communication with the cutting chamber 32 to collect vegetation that is cut by the blade 30. The collection bag 28 can be connected to at least one of the deck 14 and the handle 20. The collection bag 28 can be connected to the deck 14 at a side of the electric lawnmower 10 or at the rear of the lawnmower 10. In the exemplary embodiment of FIG. 1, the collection bag 28 is connected to the deck 14 at the rear of the lawnmower 10. The collection bag 28 can be removably mounted to the deck 14 in order to empty the cut vegetation from the collection bag 28. Alternatively, the lawnmower 10 can be operated without the collection bag 28.

The power source 36 can be a direct current motor or an alternating current motor. Referring to FIG. 2, the electric motor 36 can be a direct current outer rotor motor that includes an inner stator and an outer rotor. The power source 36 can further include a mounting base 55. The inner stator can be supported by and fixed against rotation to the deck 14 and/or a fixed portion of the housing 42 and/or the mounting base 55. The outer rotor can be supported to rotate relative to the inner stator and the mounting base 55. The mounting base 55 can be mounted on a top surface 58 of the deck 14 and connected to the deck 14 in any appropriate manner such as but not limited to mechanical fasteners. For example, the mounting base 55 can include a plurality of mounting holes spaced around the circumference of the mounting base 55. The mounting holes can include internal threads configured to engage external threads of a bolt that passes through a corresponding hole extending from the cutting chamber 32 and through the top surface 58 of the deck 14.

Figure 4:
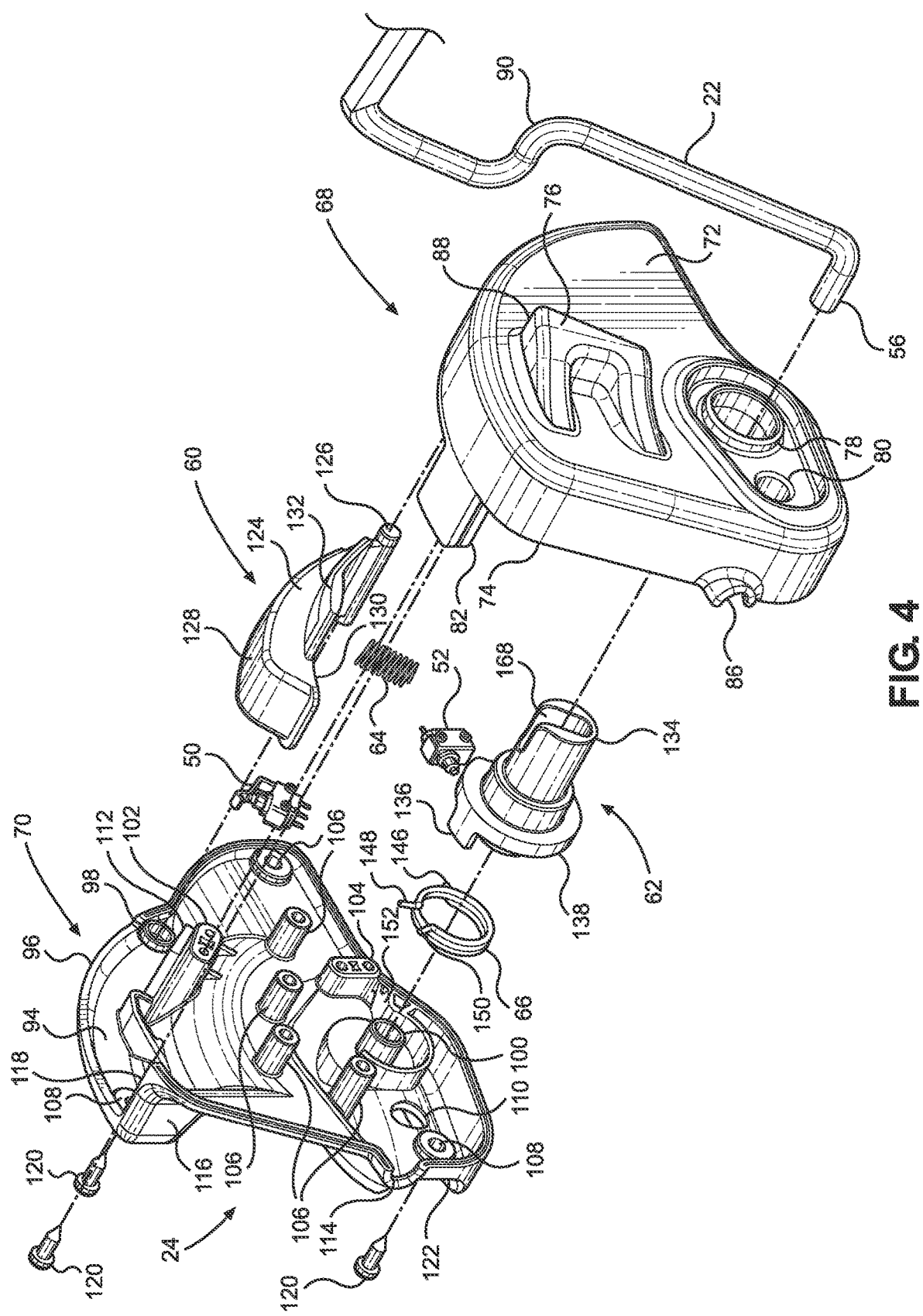
FIG. 4 is an exploded perspective view of a portion of the blade control assembly of FIG. 3.

Referring to FIGS. 3 and 4 collectively, the blade brake lever 22 can include a left end 54 and a right end 56. The left end 54 can be connected to and rotatably supported by the left extension 46 of the handle 20. The right end 56 can be connected to and rotatably supported by the first input control assembly 24.

Referring to FIG. 4, the first input control assembly 24 can include the wake switch 50, the blade switch 52, a case 59, a wake actuator 60, a cam member 62, a coil spring 64 and a torsion spring 66. The blade brake lever 22 and the cam member 62 can be collectively referred to as a blade brake actuator 22, 62. The case 59 can also be referred to as a housing or as a switch housing. The case 59 can include a first case member 68 and a second case member 70.

Figure 5:
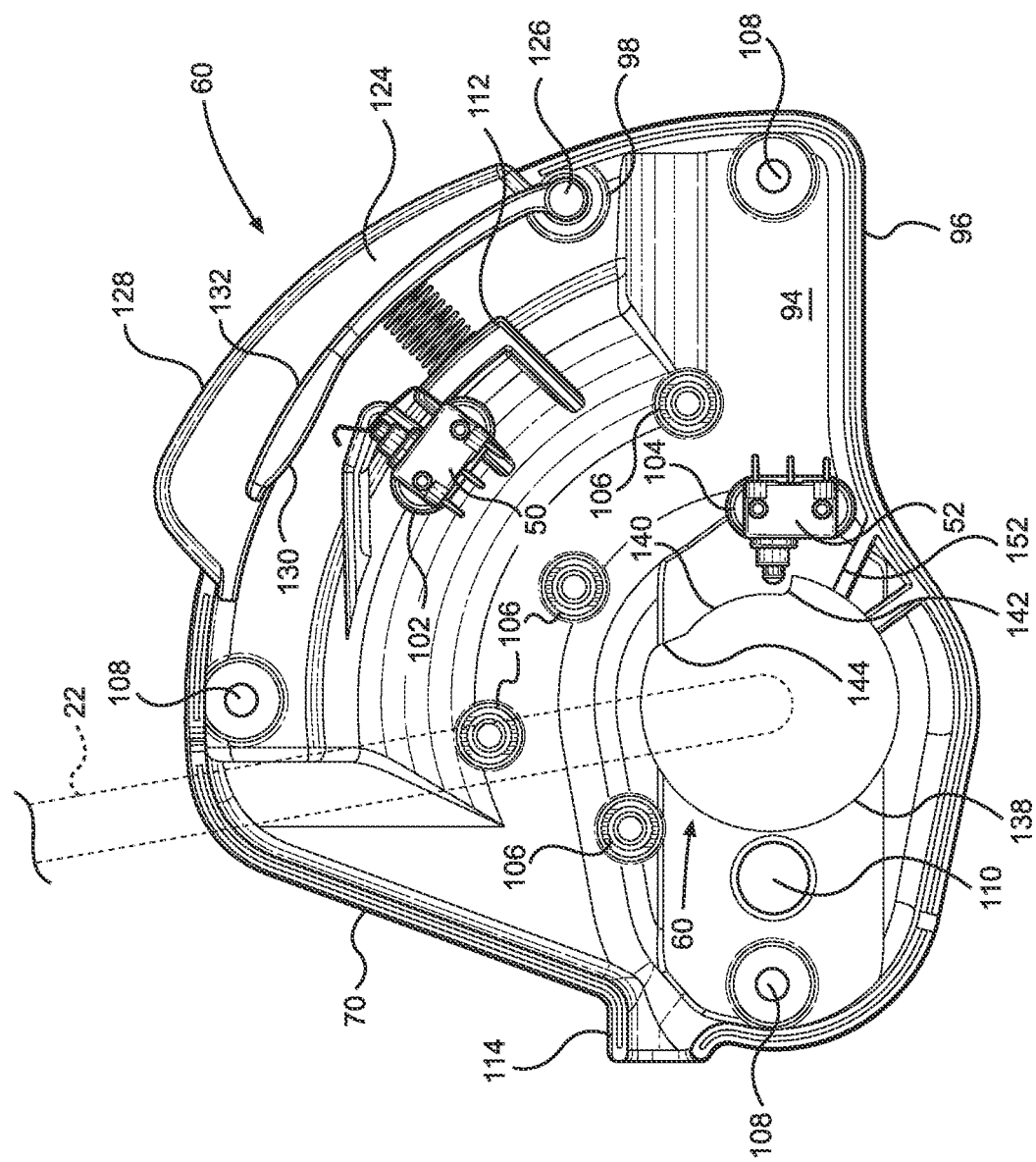
FIG. 5 is a side view of the portion of blade control assembly of FIG. 3 with a left housing member omitted.
Figure 6:
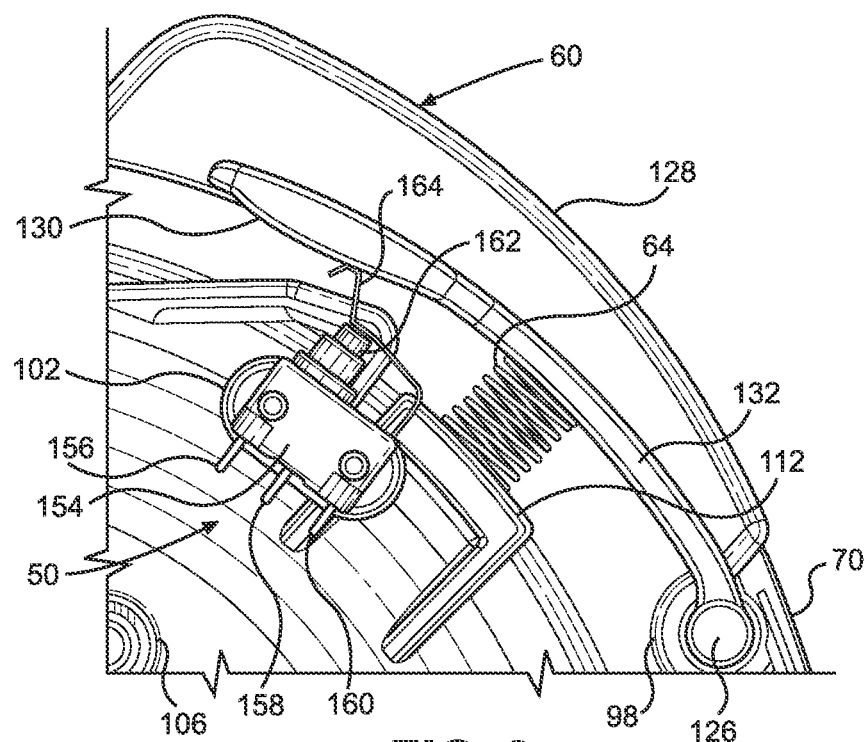
FIG. 6 is an enlarged view of an upper portion of FIG. 5.
Figure 7:
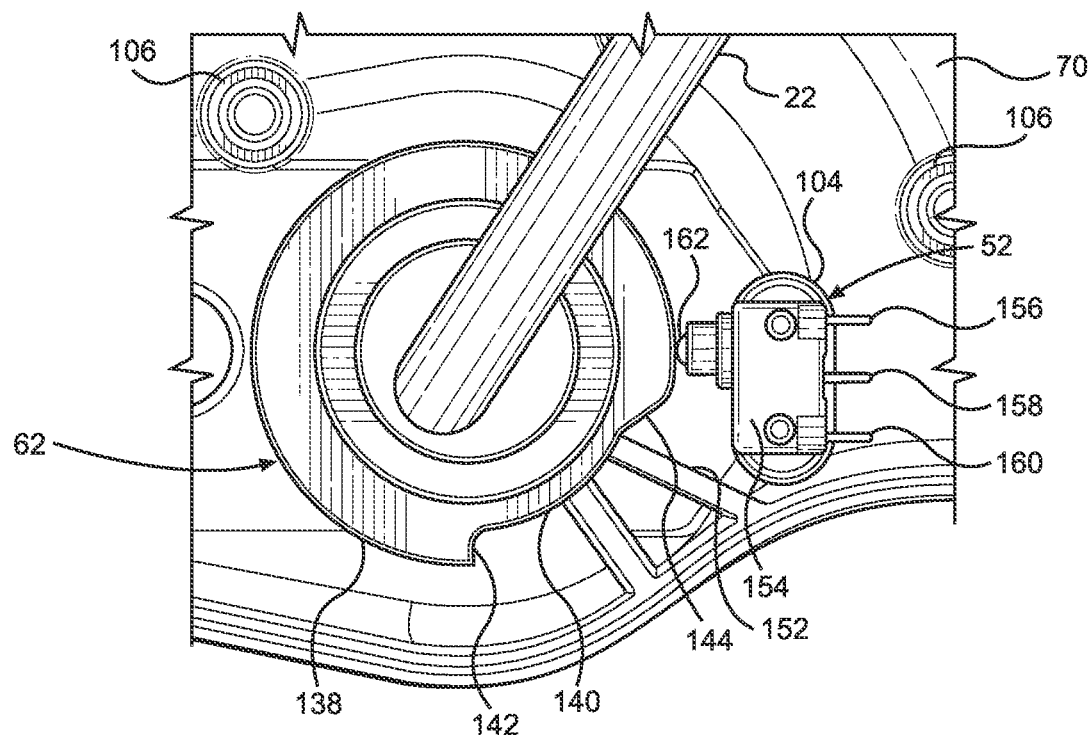
FIG. 7 is an enlarged view of a lower portion of FIG. 5.

The case 59 can contain the switches 50, 52, and the springs 64, 66 in an interior cavity formed by and between the housing members 68, 70. The case 59 can be configured to movably support the wake actuator 60 and the blade brake actuator 22, 62 between respective first positions and second positions. FIG. 5 shows the wake actuator 60 and the blade brake actuator 22, 62 in the respective first positions. FIG. 6 shows the wake actuator 60 in the second position. FIG. 7 shows the blade brake actuator 22, 62 in the second position. The coil spring 64 can bias the wake actuator 60 toward and into the first position. The torsion spring 66 can bias the blade brake actuator 22, 62 toward and into the respective first position.

The wake switch 50 can be configured to selectively transmit a wake signal or a normal signal to the PDU 40 based on the position of the wake actuator 60. The wake switch 50 can be configured to transmit the normal signal when the wake actuator 60 is in the first position. The wake switch 50 can be configured to transmit the wake signal when the wake actuator 60 is in the second position. The PDU 40 can be configured to remain in the sleep mode when the PDU 40 receives the normal signal from the wake switch 50. The PDU 40 can be configured to transition from the sleep mode to the operational mode when the PDU 40 receives the wake signal. The wake signal can also be referred to as an ON signal and the normal signal can be referred to as an OFF signal.

The blade switch 52 can be configured to selectively transmit a run signal or a normal signal to the PDU 40 based on the position of the blade brake actuator 22, 62. The blade switch 52 can be configured to transmit the normal signal when the blade brake actuator 22, 62 is in the first position. The blade switch 52 can be configured to transmit the run signal when the blade brake actuator 22, 62 is in the second position. The PDU 40 can be configured to transition the power source 36 to an idle state by disconnecting the power source 36 from the power supply 38 and stopping the blade 30, or maintain the idle state of the power source 36 and the stopped state of the blade 30, when the PDU 40 receives the normal signal from the blade switch 52. The PDU 40 can be configured to transition the power source 36 to a drive state by connecting the power source 36 to the supply power 38 so that the power source 36 drives the blade 30 when the PDU 40 receives the run signal under the conditions described below. The run signal can also be referred to as an ON signal and the normal signal can be referred to as an OFF signal.

A user of the lawnmower 10 can signal the PDU 40 to transition from the sleep mode to the operational mode by moving the wake actuator 60 to the first position. The user of the lawnmower 10 can signal the PDU 40 to start rotation of the stopped blade 30 by moving the blade brake actuator to the second position when the wake actuator 60 is in the second position. The user of the lawnmower 10 can signal the PDU 40 to stop operation of the lawnmower 10 and transition from the operational mode to the sleep mode by releasing at least the blade brake actuator 22, 62. As a result, the coil spring 64 can move the blade brake actuator 22, 62 to the first position. When a user has released at least the blade brake actuator 22, 62, the PDU 40 can be configured to signal the power source 36 to stop rotation of the blade and disconnect the power source 36 from the power supply 38. Further, PDU 40 can be configured to transition from the operational mode to the sleep mode after the user has released at least the blade brake actuator 22, 62.

Figure 8:
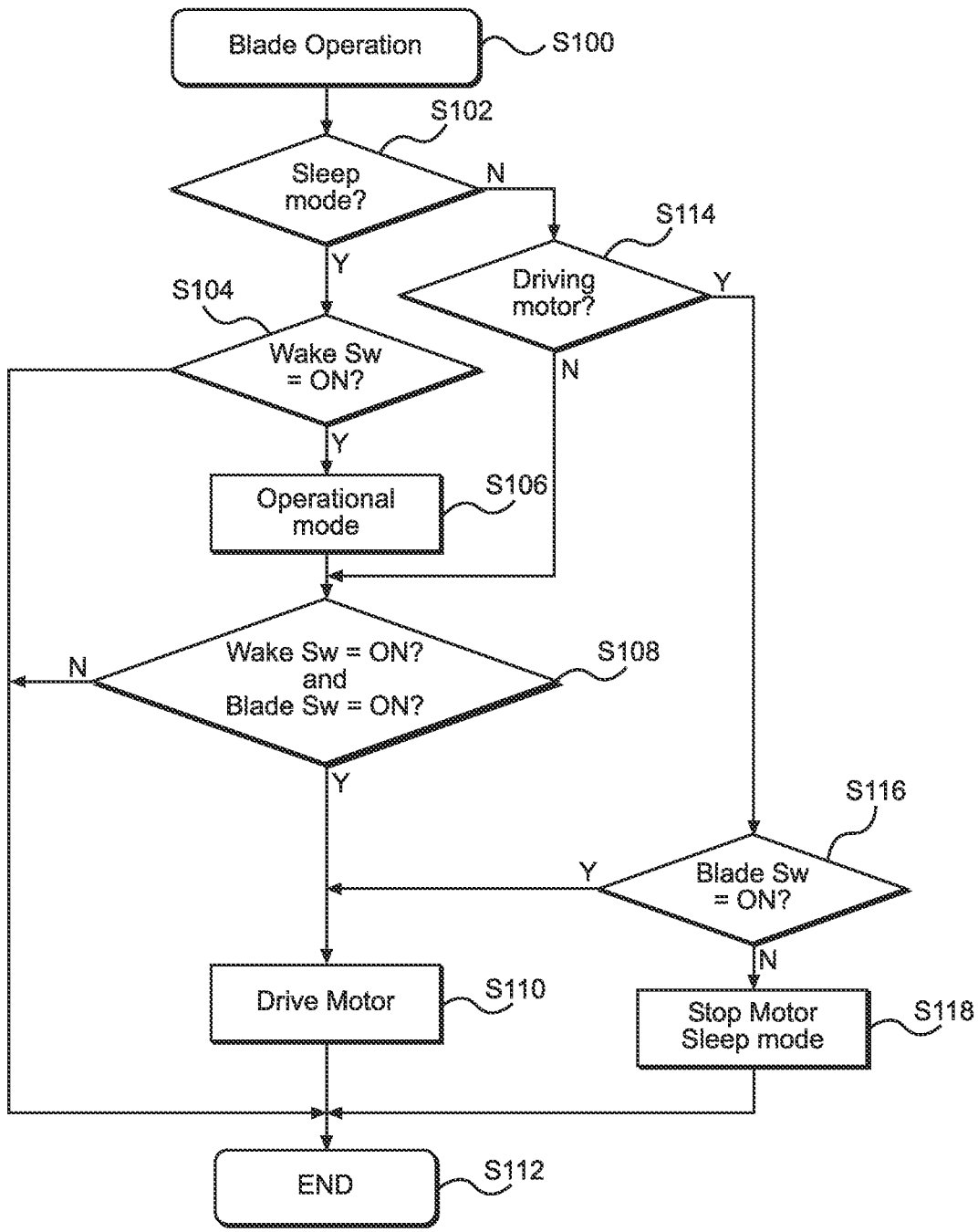
FIG. 8 is a flowchart illustrating an exemplary algorithm that can be executed by the blade control assembly of the lawnmower of FIG. 1.

FIG. 8 illustrates a flowchart of an exemplary blade operation algorithm that the PDU 40 can execute to cause the power source 36 to drive and stop rotation of the blade 30 and to transition between the sleep and operational modes. The PDU 40 can initiate the blade operation algorithm at step S100. Subsequently, the PDU can move to step S102.

At step S100, either the user is currently operating the lawnmower 10 and the PDU 40 is currently in the operational mode, or the user is placing the lawnmower 10 into service from a disuse state and the PDU 40 is currently in the sleep mode. At step S102, the PDU 40 can be configured to determine whether the PDU 40 is currently in the sleep mode or the operational mode. If the PDU 40 determines that the PDU 40 is in the sleep mode, the PDU 40 can move to step S104. If the PDU 40 is not in the sleep mode, i.e., the PDU 40 is in the operational mode, then the PDU 40 can move to step S114 where the PDU 40 can begin a process that determines whether to continue or stop operation of the blade 30, and transitions the PDU 40 from the operational mode to the sleep mode.

At step S104, the PDU 40 is in the sleep mode. Thus, the power source 36 is disconnected from the power supply 38, and the blade 36 stopped. At step S104, the PDU 40 can be configured to determine whether a user has requested a change in the state of the lawnmower 10. For example, the PDU 40 can be configured to identify the signal received from the wake switch 50. Based on the identified signal, the PDU 40 can transition from the sleep mode to the operational mode, or remain in the sleep mode. If lawnmower 10 is in an unused state, then the coil spring 62 can hold the wake actuator 60 in the first position and the wake switch 50 transmits the normal (OFF) signal to the PDU 40. A user can signal the PDU 40 to initiate operation of the lawnmower 10 by moving wake actuator 60 to the second position. As a result, the wake switch 50 can transmit the wake (ON) signal to the PDU 40. If the PDU 40 receives the wake (ON) signal, then a user is initiating operation of the lawnmower 10 and the PDU 40 can move to step S106. If the PDU 40 receives the normal (OFF) signal from the wake switch 50, then a user has not initiated operation of the lawnmower 10, and the PDU 40 can remain in the sleep mode and move to step S112 where the PDU 40 can end the blade operation algorithm.

At step S106, the PDU 40 can be configured to select the operational mode and transition from the sleep mode to the operational mode. In the operational mode, the PDU 40 can be configured to consume power from the power supply 38 at a rate that is higher than the power consumption rate in the sleep mode. Alternatively, or in addition, the PDU 40 can be configured to execute one or more steps or one or more tasks at a higher frequency as compared to the sleep mode. Alternatively, or in addition, the PDU 40 can be configured to execute more tasks as compared to when in the sleep mode. The PDU 40 can be configured with any other appropriate performance capability while in the operational mode that is not otherwise available when in the sleep mode. Then the PDU 40 can move to step S108.

At step S108, the blade can be in a stopped state and the PDU 40 can be in a ready state of the operational mode. The PDU 40 can be configured to determine whether to signal the power source 36 to start driving the blade 30. The PDU 40 can be configured to identify the signals received from both of the wake switch 50 and the blade switch 52. If the PDU 40 determines that the PDU 40 has simultaneously received the wake (ON) signal from the wake switch 50 and the run (ON) signal from the blade switch 52, then the PDU 40 can move to step S110. If the PDU 40 determines at step S108 that either one of the switches 50, 52 is transmitting the normal (OFF) signal (or alternatively, that either one of the switches 50, 52 has terminated the respective ON signal), then the PDU can be configured to move to step S112 where the PDU 40 can end the blade operation algorithm. The PDU 40 can remain in the ready state of the operational mode until such time that the PDU 40 can transition from step S108 to step S110.

At step S110, the PDU 40 can be configured to connect the power source 36 to the power supply 38 and signal the power source 36 to rotate the blade 30 at a predetermined speed or at a speed selected by the user based on an additional user input. Thus, the PDU 40 can be configured to initiate rotation of the blade 30 from a stopped state when the PDU 40 simultaneously or nearly simultaneously receives the ON signal from both switches 50, 52. From step S110, the PDU can be configured to move to step S112 where the PDU 40 can end the blade operation algorithm.

As discussed above, the PDU 40 can be configured to move to step S114 if the PDU 40 is in the operational mode when the PDU 40 executes step S102. At step S114, the PDU 40 can be configured to determine whether the PDU 40 is currently signaling the power source 36 to rotate the blade 30. If the PDU 40 determines that the PDU 40 is not currently signaling the power source 36 to rotate the blade 30, the PDU 40 can be configured to execute steps S108, S110 and S112 or steps S108 and S112 as discussed above. If the PDU 40 determines that the power source 36 is currently rotating the blade 30, then the PDU 40 can be configured to move to step S116 where the PDU 40 can be configured to determine whether to continue signaling the power source 36 to rotate the blade 30.

At step S116, the PDU 40 can be configured to determine whether the blade switch 52 is transmitting the run (ON) signal to the PDU 40 or terminated the transmission of the run (ON) signal. If the PDU 40 receives the run (ON) signal, then the PDU 40 can be configured to move to steps S110 and S112 as described above. If the PDU 40 receives the normal (OFF) signal from the blade switch 52 (or alternatively, the run (ON) signal from the second switch 52 terminates), then the user has released the blade brake actuator 22, 62 while the PDU 40 is in the operational mode. Thus, the PDU 40 can be configured to move to step S118.

At step S118, the PDU 40 can be configured to signal the power source 36 to stop rotation of the blade 30 and disconnect the power source 36 from the power supply 38. Further, the PDU 40 can be configured to select the sleep mode and transition from the operational mode to the sleep mode. Thus, the PDU 40 can be configured to automatically transition from the operational mode to the sleep mode when the user releases the blade brake actuator 22, 62.

In accordance with the exemplary algorithm of FIG. 8, the PDU 40 can be configured to initiate rotation of a stopped blade 30 when the PDU 40 receives the wake (ON) signal from the wake switch 50 together with the run (ON) signal from the blade switch 52. Further, the PDU 40 can be configured to continue rotation of the blade independent of the signal received from the wake switch 50. That is, the PDU 40 can be configured to continue signaling the power source 36 to rotate the blade 30 if the wake (ON) signal from the first switch 50 terminates while receiving the run (ON) signal, or the PDU 40 receives the normal (OFF) signal from the first switch 50 while receiving the run (ON) signal from the second switch 52. Further still, the PDU 40 can be configured to stop rotation of the blade 30 and transition from the operational mode to the sleep mode based on the same signal received from the blade switch 52 and independent of the position of the wake actuator 60 and the signal transmitted by the wake switch 50.

Further details of the first input control assembly 24 will now be described with reference to FIGS. 3-7.

The switches 50, 52 can be any appropriate switch or sensor that is configured to provide the PDU 40 with respective signals so that the PDU 40 can differentiate between the first position of each of the wake actuator 60 and the blade brake actuator 22, 62 and the second position of each of the wake actuator 60 and the blade brake actuator 22, 62. In an exemplary embodiment, each of the switches 50, 52 can be configured as a sub-micro switch (also referred to as a micro switch or a snap-action switch). The wake switch 50 can be configured to output the normal (OFF) signal when the wake actuator 60 is spaced away from the wake switch 50 and the wake (ON) signal when wake actuator 50 applies an input force to the wake switch 50. The blade switch 52 can be configured to output the normal (OFF) signal when the blade brake actuator 22, 62 is spaced away from the wake switch 52 and the wake (ON) signal when blade brake actuator 22, 62 applies an input force to the wake switch 52. The switches 50, 52 can be identical to or substantially identical to each other.

Referring to FIGS. 6 and 7, each of the blade switches 50, 52 can include a switch housing 154, a common terminal 156, a normally open terminal 158, a normally closed terminal 160 and push button 162. The common terminal 156 can provide an electrical input to the blade switch 52. The blade switch 52 can connect the normally closed terminal 160 to the common terminal 156 when the blade brake actuator 22, 62 does not input a force to the push button 162. Further, the wake switch 50 can connect the normally closed terminal 160 to the common terminal 156 when the wake actuator 60 does not input a force to the push button 162.

In an exemplary embodiment, the wake switch 50 can include a lever 164 that is omitted from the blade switch 52. The lever 164 can be effectively an extension of the push button 162. The lever 164 can be secured to the housing 154 in any appropriate manner. The lever 164 can continuously engage the push button 162. The lever 164 can be elastically deformed when the wake actuator applies a force to the lever 164. However, the lever 164 can be omitted from the wake switch 50 or added to the blade switch 52.

The PDU 40 can be configured to control the flow of electricity into each of the switches 50, 52 via the common terminal 156. The electricity input to the switches 50, 52 via the common terminal 156 can return to the PDU 40 via the connected one of the normally opened terminal 158 and the normally closed terminal 160.

The PDU 40 can be mounted in the motor housing 42. Wires (also referred to as a wire harness or as a wire harness) can be connected to the PDU 40 and each of the terminals 156, 158, 160. FIG. 2 schematically represents the wires 166. The wires 166 can be routed along or inside the handle 20 as the wires 166 extend from the case 59 to the PDU 40.

Referring to FIGS. 3 and 4, the first case member 68 can include a main wall 72, a peripheral wall 74, a lever stop 76, a bearing 78, a mounting hole 80, an upper projection 82, a lower projection 84 and outlet projection 86. (The lower projection 84 is obstructed from view in view FIG. 4 by the main wall 72).

The main wall 72 can oppose the second case member 70. The peripheral wall 74 can project from the main wall 72 toward the second case member 70 and can surround the main wall 72. The peripheral wall 74 can be perpendicular or substantially perpendicular to the main wall 72 such that one skilled in the art would perceive the walls 72, 74 as being perpendicular to each other.

The lever stop 76 can extend away from an exterior surface of the main wall 72 in a direction toward the blade brake lever 22. The lever stop 76 can include an end wall 88 that the blade brake lever 22 abuts when the blade brake lever 22 is in the first position. The blade brake lever 22 can include a bend 90. A portion of the blade brake lever 22 that is between the right end 56 and the bend 90 can abut the end wall 88 when the blade brake lever 22 is in the first position.

Referring to FIG. 4, the bearing 78 can rotatably support the cam member 62. The bearing 78 can include a cylindrical bearing surface that surrounds a hole that passes through the main wall 72. The bearing 78 can rotationally support the cam member 62 as the blade brake actuator 22, 62 moves between the first and second positions.

The mounting hole 80 can pass through the main wall 72. Referring to FIG. 3 the mounting hole 80 and can cooperate with a mounting fastener 92 to secure the case 59 to the right extension 44 of the handle 22.

Referring to FIGS. 3 and 4 collectively, the upper projection 82 and the lower projection 84 can be connected to and extend away from the peripheral wall 74 and abut the second case member 70. The lower projection 84 can be spaced away from the upper projection 82 along the extent of the peripheral wall 74. The wake actuator 60 can be received in the space between the upper projection 82 and the lower projection 84. The wake actuator 60 can extend into and out of the case 59 at this space. The wake actuator 60 can move through the space as the wake actuator 60 moves between the first and second positions.

The outlet projection 86 can be connected to and extend away from the peripheral wall 74. The outlet projection 86 can include a concave surface that faces the second case member 70. The outlet projection 86 can have a semi-cylindrical shape.

Referring to FIGS. 4 and 5, the second case member 70 can include a main wall 94, a peripheral wall 96, a first bearing, 98, a second bearing 100, a first switch mount 102, a second switch mount 104, a plurality of posts 106, a plurality of fastener holes 108, a mounting hole 110, a spring shelf 112 and an outlet projection 114. (The second bearing 100 is obstructed from view in FIG. 5 by the cam member 62).

The main wall 94 can oppose and be spaced away from the main wall 72 of the first case member 70. The peripheral wall 96 can project from the main wall 94 toward the second case member 70 and can surround the main wall 94. The peripheral wall 96 can be perpendicular or substantially perpendicular to the main wall 94 such that one skilled in the art would perceive the walls 94, 96 as being perpendicular to each other. The peripheral wall 96 can abut the peripheral wall 74 and the projections 82, 84 of the first case member 68.

The main wall 94 and the peripheral wall 96 can form a projecting wall 116 that extend toward the first case member 68. The projecting wall 116 can include a rear edge 118. The upper projection 82 of the first case member 68 can abut the rear edge 118.

The first bearing 98 can be connected to and extend from the main wall 94 of the second case member 70. The first bearing 98 can include a cylindrical projection and a concentric blind hole that terminates at the main wall 94. The first bearing 98 can support the wake actuator 60 as the wake actuator 60 moves between the first and second positions.

The first case member 68 can include a bearing that corresponds to the first bearing 98 of the second case member 70. The bearing is obstructed from view in FIG. 4 by the main wall 72.

The second bearing 100 can be connected to and extend from the main wall 94 of the second case member 70. The second bearing 100 can be aligned with the bearing 78 of the first case member 68. The second bearing 100 can include a hollow cylindrical projection that is closed at one end by the main wall 94. The second bearing 100 and the bearing 74 can rotationally support the cam member 62 as the blade brake actuator 22, 62 moves between the first and second positions.

The switch mounts 102, 104 can be connected to and extend from the main wall 94. The switch mounts 102, 104 can extend toward the main wall 94 of the first case member 68. The wake switch 50 can be mounted on and connected to the first switch mount 102 and the blade switch 52 can be mounted on and connected to the second switch mount 104 in any appropriate manner such as but not limited to a mechanical fastener(s) staking, insert molding, adhesive, press-fit, snap connector(s), and/or any combination of these structures or methods for attachment.

The posts 106 can be connected to and extend away from the main wall 94. The posts 106 can extend toward and abut the main wall 72 of the first case member 68. The posts 106 can support the main walls 72, 94 such that the posts 106 limit deflection of the main walls 72, 94 toward each other. The posts 106 can support electrical wires 166 that are connected to the switches 50, 52. (The wires 166 are omitted from FIGS. 4 and 5 for simplicity and clarity of the drawings, while the wires 166 are schematically illustrated in FIG. 2). The posts 106 can be hollow cylinders. However, the posts 106 can have any appropriate shape. Further, one or more of the posts 106 can have a unique shape.

The fastener holes 108 can pass through the main wall 94. The first housing member 68 can include a plurality of blind bores that are aligned with the fastener holes 108. (The blind bores are obscured from view in FIG. 4). The case 59 can include a plurality of fasteners 120 that each pass through a respective one of fastener holes 108 and are secured into a respective one of the blind bores in the first housing member 68 such that the fasteners 120 can connect the first housing member 68 to the second housing member 70. The fasteners 120 can be any appropriate fasteners such as but not limited to tapping screws, other threaded fasteners, snap-fit connectors, clips, or any combination.

Referring to FIGS. 3 and 4 collectively, the main wall 94 can include a concave external surface 122. The external surface 122 can abut the right extension 44 of the handle 20. The mounting hole 110 can pass through the main wall 94 and the concave surface 122. The mounting hole 110 can be aligned with the mounting hole 80 of the first case member 68. The mounting fastener 92 can pass through the mounting holes 80, 110 and the handle 20 and can be fixed to the case 59 and the handle 20. The mounting fastener 92 can be any appropriate structure such as but not limited a bolt and nut, a clamp, a rivet, or any combinations thereof.

The spring shelf 112 can be connected to and extend from the main wall 94. The spring shelf 112 can support and retain the coil spring 64 on the second case member 70. The coil spring 64 can be fixed to the spring shelf 122 in any appropriate manner such as but not limited to staking, adhesive, a clamp, a latch, an interference fit, or any combinations thereof.

The outlet projection 114 can be connected to and extend away from the peripheral wall 96. The outlet projection 114 can include a concave surface that faces the first case member 68. The outlet projection 114 can have a semi-cylindrical shape. The outlet projection 114 can oppose the outlet projection 86 of the first case member 68. Together, the outlet projections 86, 114 can form an outlet through which the wires 166 connected to the switches 50, 52 can exit the case 59 and pass to the PDU 40 and the power supply 38.

The coil spring 64 can bias the wake actuator 60 toward the first position in a direction away from the case 59. A user can push the wake actuator 60 toward the case 59 against the bias of the coil spring 64 such that the wake actuator 60 moves toward the spring shelf 112 and compresses the coil spring 64. The wake actuator 60 can be referred to as a push knob.

The wake actuator 60 can include a main body 124, a pivot shaft 126, a user surface 128, an engagement surface 130, a flange 132 and a shaft 134.

The pivot shaft 126 can be connected to and extend from the main body 124 toward both of the main walls 72, 94. The pivot shaft 126 can be rotationally supported by the first bearing 98 of the second case member 70 and the corresponding bearing of the first case member 68. The main body 124 can pivot about a rotational axis of the pivot shaft 126 as the wake actuator 60 moves between the first and second positions.

The main body 124 can include the user surface 128 and the engagement surface 130. The user surface 128 can include a surface texture such as but not limited to knurls, raised bumps, ribs, or any combination that can enhance the frictional engagement between the user surface 128 and a user's bare hand or glove. The engagement surface 130 can be on a side of the main body 124 that is opposite to a side of the main body 124 on which the user surface 128 is located such that the engagement surface 130 is opposite to the user surface 128. The engagement surface 130 can abut the coil spring 64 when the wake actuator 60 is in and moves between each of the first position and the second position.

The engagement surface 130 can be configured to selectively apply a force to the push button 162 via the lever 164 of the wake switch 50. When the wake actuator 60 is in the first position, the engagement surface 130 can be spaced away from the push button 162 such that the wake switch 50 connects the normally closed terminal 158 to the common terminal 156 and the PDU 40 receives a normal (OFF) signal from the wake switch 50. FIG. 5 shows the wake actuator 60 in the first position. When a user moves the wake actuator 60 to the second position, the engagement surface 130 can apply a force to the push button 162 such that the wake switch 50 connects the normally opened terminal 158 to the common terminal 156 and the PDU 40 receives the wake (ON) signal from the wake switch 50. FIG. 6 shows the wake actuator 60 in the second position.

The flange 132 can be connected to and extend from the main body 124. The flange 132 can extend toward the first case member 68. The flange 132 can abut an inner surface of the peripheral wall 74 of the first case member 68 when the wake actuator 60 is in the first position. Thus, the flange 132 and the peripheral wall 74 can limit movement of the wake actuator 60 by the coil spring 64.

Referring to FIGS. 3 and 4 collectively, the shaft 134 can pass through the hole of the bearing 78 and project outside of the case 59. The bearings 78, 100 can rotatably support the cam member 62 when a user pivots the blade brake lever 22 to move the blade brake actuator 22, 62 from the first position to the second position and when the torsion spring 66 biases the blade brake actuator 22, 62 to move from the second position to the first position.

Referring to FIGS. 5 and 7, the cam member 62 can include a main surface 138, a recessed surface 140, an abutment surface 142 and a camming surface 144. The main surface 138 can be a cylindrical surface that extends from and between the abutment surface 142 to the camming surface 144 in a circumferential direction of the cam member 62. The recessed surface 140 can extend from and between each of the abutment surface 142 and the camming surface 144. The main surface 138 and the recessed surface 140 can be concentric cylindrical surfaces such that the radius of the recessed surface 140 is less than the radius of the main surface 138. The camming surface 144 can be a curved surface that provides a smooth transition from the recessed surface 140 to the main surface 138.

The cam member 62 can be oriented relative to the blade switch 52 such that the camming surface 144 or the main surface 138 engages the push button 162 when the blade brake actuator 22, 62 is in the second position, and such that the recessed surface 140 opposes and is spaced away from the push button 162 when the blade brake actuator 22, 62 is spaced away from the second position. FIG. 5 shows the blade brake actuator 22, 62 in the first position and FIG. 7 shows the brake actuator 22, 62 in the second position.

The camming surface 144 or the main surface 138 can be configured to selectively apply a force to the push button 162 of the blade brake switch 52. When the blade brake actuator 22, 62 is in the first position, the camming surface 144 or the main surface 138 can be spaced away from the push button 162 such that the blade brake switch 52 connects the normally closed terminal 158 to the common terminal 156 and the PDU 40 receives a the normal (OFF) signal from the blade brake switch 52. FIG. 5 shows the blade brake actuator 22, 62 in the first position. When a user moves the blade brake actuator 22, 62 to the second position, the camming surface 144 or the main surface 138 can apply a force to the push button 162 such that the blade brake switch 52 connects the normally opened terminal 158 to the common terminal 156 and the PDU 40 receives the run (ON) signal from the wake switch 50. FIG. 7 shows the blade brake actuator 62 in the second position.

Referring to FIG. 4, the torsion spring 66 can be mounted on the second case member 70 about the second bearing 100. The torsion spring 66 can include a first arm 146, a second arm 148 and a third arm 150. The second case member 70 can include an intermediate wall 152 that is connected to and extends from the main wall 94. The first arm 146 can be fixed to the intermediate wall 152 in any appropriate manner. The third arm 150 can be spaced away from the first arm 148. The cam member 62 can include a projection 136 that extends into the space between the second and third arms 148, 150 and engages each of the second and third arms 148, 150. The torsion spring 66 can bias the blade brake actuator 22, 62 toward and into engagement with the end wall 88 of the lever stop 76.

Referring to FIG. 4, the cam member 62 can include a slot 168 formed in the shaft 134. The right end 56 of the blade brake lever 22 can be inserted into and secured in the slot 168. The right end 56 can be connected to the cam member 62 in any appropriate manner such as but not limited to a mechanical fastener, adhesive, an interference fit, staking, or any combinations thereof.

The PDU 40 (also referred to as a controller, an electronic control unit ("ECU") or a central processing unit ("CPU")) can be in electrical communication with the power source 36 and configured to selectively activate and deactivate the power source 36 based on user inputs to the blade control assembly 12. The PDU 40 can be configured with hardware, with or without software, to perform the assigned task(s). The PDU 40 can include a processor that is in electrical communication with one or more memory devices such as but not limited to read-only member device or a random access memory device While certain embodiments of the invention are described above, it should be understood that the invention can be embodied and configured in many different ways without departing from the spirit and scope of the invention.

For example, embodiments are disclosed above in the context of a walk-behind lawnmower 10 shown in FIG. 1. However, alternate embodiments can include any type of lawnmower, such as but not limited to a riding lawnmower or a zero-turn-radius lawnmower. Further, exemplary embodiments of the lawnmower 10 can be self-propelled via the power source 36 in any appropriate manner and controlled by the second input control assembly 26. Other exemplary embodiments can omit the self-propulsion system and omit the second input control assembly 26. However, the above alternative embodiments are merely provided for exemplary purposes, and as indicated above, embodiments include any type of lawnmower disclosed above.

The switches 50, 52 are described above as being sub-micro switches configured in a normally closed state. However, alternate embodiments can substitute one or both of the switches 50, 52 with any appropriate mechanical switch, electro-mechanical switch, electronic switch, electronic sensor, electro-mechanical sensor. Further, the wake switch 50 can be a different type of switch as compared to the blade brake switch 52.

Alternate embodiments can include a blade operation algorithm that includes one or more time out conditions. For example, the PDU 40 can be configured to initiate a timer when the PDU 40 transitions from the sleep mode to the operational mode at step S106, and execute a timer check step after determining that the power source 36 is not driving the blade 30 at step S114. ("No" condition at step S114). If the timer has expired, then the PDU 40 can be configured to transition to the sleep mode and proceed to step S112 and exit the blade operation algorithm. This can limit power consumption by the PDU 40 if the wake switch is inadvertently moved to the second position.

Alternate embodiments can add a timer to the two signal checks at step S108 with a timer check. For example, the PDU 40 can be configured to initiate a timer when the PDU 40 transitions from the sleep mode to the operational at step S106, and execute a timer check along with the checks for the wake (ON) signal from the wake switch 50 and the run (ON) signal from the blade switch 52. This timer check can enhance the safe operation of lawnmower 10.

The exemplary embodiments described above house the switches 50, 52 in the case 59. However, alternate embodiments can include a separate case for each switch and actuator combination. In a first alternate embodiment, each of the switches 50, 52 can be mounted on a respective one of the extensions 44, 46. In a second alternate embodiment, one of the switches 50, 52 can be mounted on the U-shaped portion 48 of the handle 20 and the other of the switches 50, 52 can be mounted on either one of the extensions 44, 46. Instead of the first input control assembly 24, alternate embodiments of the second input control assembly 26 can include the wake switch 52.

The exemplary embodiments disclosed above include actuators that pivot into and out of engagement with the switches. However, exemplary embodiments can include any type of motion for the actuators such as but not limited a sliding motion or a rotational motion.

Alternate embodiments can substitute the blade brake lever 22 and the cam member 62 with a duplicate of the wake actuator 60. Alternate embodiments can substitute the cam member 62 with a simple lever that is cantilevered to the right end 56 of the blade brake lever 22.

Alternate embodiments can include the wake actuator 60 and the wake switch 50 integrated onto the blade brake actuator 22, 62 such that the wake actuator 60 moves with the blade brake lever 22.

Alternate embodiments of the lawnmower can include more than one blade. Each blade can be driven by a common motor. Alternate embodiments can include a separate motor for each blade.

Alternate embodiments can include the one or more memory devices integrated with the PDU 40.

In alternate embodiments the power source can include an internal combustion engine instead or in addition to an electric motor, and the PDU 40 can be configured to electrically actuate a clutch that selectively couples and uncouples the blade and the power source, and to electrically actuate a brake mechanism that stops rotation of the blade.

What is claimed is:

1. A blade control assembly for a lawnmower including a power source and a blade rotatably driven by the power source, the blade control assembly comprising:
    a controller configured to,
        selectively transition between a sleep mode and an operational mode,
        transition from the sleep mode to the operational mode when the controller receives a first ON signal,
        cause the power source to transition from an idle state in which the blade is stopped to a driving state in which the power source rotationally drives the blade when the controller receives the first ON signal and a second ON signal,
        continue signaling the power source to drive the blade if the first ON signal terminates while receiving the second ON signal,
        cause the power source to stop rotation of the blade and cause the power source to transition to the idle state after the second ON signal terminates, and
        transition from the operational mode to the sleep mode after the second ON signal terminates.

2. The blade control assembly according to claim 1, wherein the controller is configured to cause the power source to transition from the idle state to the driving state when the controller receives the second ON signal simultaneously with the first ON signal.

3. The blade control assembly according to claim 1, further comprising:
    a first switch in electrical communication with the controller and configured to selectively output the first ON signal.

4. The blade control assembly according to claim 3, further comprising:
    a first actuator movable relative to the first switch between a first position and a second position such that the first switch terminates the first ON signal when the first actuator is in the first position and transmits the first ON signal when the first actuator is in the second position.

5. The blade control assembly according to claim 4, wherein
    the first actuator is biased toward the first position,
    the first actuator includes a pivot shaft and a lever arm extending from the pivot shaft,
    the lever arm includes a user surface and an engagement surface opposite to the user surface, the engagement surface engages the first switch when a user applies a force to the user surface and moves the first actuator to the second position, and
    the engagement surface is spaced away from the first switch when the first actuator is in the first position.

6. The blade control assembly according to claim 4, further comprising:
    a casing;
    a second switch in electrical communication with the controller and configured to selectively output the second ON signal, the second switch is mounted in the casing; and
    a second actuator pivotally mounted on the casing and movable relative to the second switch between an engaged position and a disengaged position such that the second switch terminates the second ON signal when the second actuator is in the disengaged position and transmits the second ON signal when the second actuator is in the engaged position, wherein
    the first actuator is pivotally mounted on the casing, and
    the first switch is mounted in the casing.

7. The blade control assembly according to claim 3, further comprising:
    a second switch in electrical communication with the controller and configured to selectively output the second ON signal.

8. The blade control assembly according to claim 7, further comprising:
    a second actuator movable relative to the second switch between a first position and a second position such that the second switch terminates the second ON signal when the second actuator is in the first position and transmits the second ON signal when the second actuator is in the second position.

9. The blade control assembly according to claim 8, wherein
    the second actuator includes a pivotable lever and a cam member that rotates as the lever pivots between an engaged position and a disengaged position,
    the cam member is spaced away from the second switch when the lever is in the disengaged position, and the cam member engages the second switch when the lever is in the engaged position, and
    the lever is biased toward the disengaged position.

10. A lawnmower comprising:
    a deck including a cutting chamber;
    a power source mounted on the deck;
    a blade rotatably supported in the cutting chamber and rotationally driven by the power source;
    an input control assembly configured to selectively transmit a first ON signal, a first OFF signal, a second ON signal, and a second OFF signal; and
    a controller in electrical communication with the input control assembly and configured to,
        selectively transition between a sleep mode and an operational mode,
        transition from the sleep mode to the operational mode when the controller receives the first ON signal,
        cause the power source to transition from an idle state in which the blade is stopped to a driving state in which the power source rotationally drives the blade when the controller receives the first ON signal and the second ON signal,
        continue causing the power source to drive the blade when the controller receives the second ON signal and the first OFF signal,
        cause the power source to stop rotation of the blade and transition to the sleep mode when the controller receives the second OFF signal.

11. The lawnmower according to claim 10, wherein the input control assembly includes a first switch in electrical communication with the controller and configured to selectively output the first ON signal and the first OFF signal.

12. The lawnmower according to claim 11, wherein the input control assembly includes a second switch in electrical communication with the controller and configured to selectively output the second ON signal and the second OFF signal.

13. The lawnmower according to claim 12, further comprising:
a handle connected to and extending away from the deck, wherein the first switch and the second switch are mounted on the handle.

14. The lawnmower according to claim 10, further comprising:
a handle including a pair of arms connected to and extending away from the deck, and a grip bar extending from each of the arms; and
a casing mounted on one of the arms,
wherein the input control assembly includes,
  a first switch mounted in the casing and in electrical communication with the controller and configured to selectively output the first ON signal and the first OFF signal, and
  a second switch mounted in the casing and in electrical communication with the controller and configured to selectively output the second ON signal and the second OFF signal.

15. The lawnmower according to claim 14, wherein the input control assembly includes,
a first actuator pivotally mounted on the casing and movable relative to the first switch between a first position and a second position such that the first switch sends the first OFF signal when the first actuator is in the first position and sends the first ON signal when the first actuator is in the second position, and
a second actuator pivotally mounted on the casing, and the second actuator is movable relative to the second switch between an engaged position and a disengaged position such that the second switch sends the second OFF signal when the second actuator is in the disengaged position and sends the second ON signal when the second actuator is in the engaged position.

16. The lawnmower according to claim 15, further comprising:
a pair of front wheels connected to the deck;
a pair of rear wheels connected to the deck; and
a collection bag in communication with the cutting chamber and removably connected to at least one of the deck and the handle.

17. The lawnmower according to claim 10, further comprising:
a battery in electrical communication with the controller, wherein
the power source includes an electric motor connected to the blade and in electrical communication with the controller, and
the controller is configured to selectively regulate electrical communication between the battery and the electric motor.

18. A method for operating a blade control system for a lawnmower having a controller, a power source, and a blade, the method comprising:
holding down a button to engage a first switch;
causing the controller to transition from a sleep mode to an operational mode and wait in a ready state of the operational mode in response to the button engaging the first switch;
rotating a lever to engage a second switch while the button engages the first switch;
driving the power source with the controller to initiate rotation of the blade while the button engages the first switch and the lever engages the second switch;
releasing the button while the lever engages the second switch and the controller is driving the power source;
using the controller to cause the power source to stop rotation of the blade after releasing the lever; and
transitioning the controller from the operational mode to the sleep mode after stopping rotation of the blade and operation of the power source.

19. The method according to claim 18, wherein
the power source includes an electric motor,
using the controller to cause the power source to initiate rotation of the blade includes causing the controller to electrically connect the electric motor with a battery of the lawnmower, and
using the controller to cause the power source to stop rotation of the blade includes using the controller to electrically disconnect the electric motor from the battery.

* * * * *